Oct. 21, 1952     P. Q. R. SCHREIBER     2,614,596
MACHINE FOR CUTTING TOBACCO AND THE LIKE
Filed March 29, 1950     2 SHEETS—SHEET 1
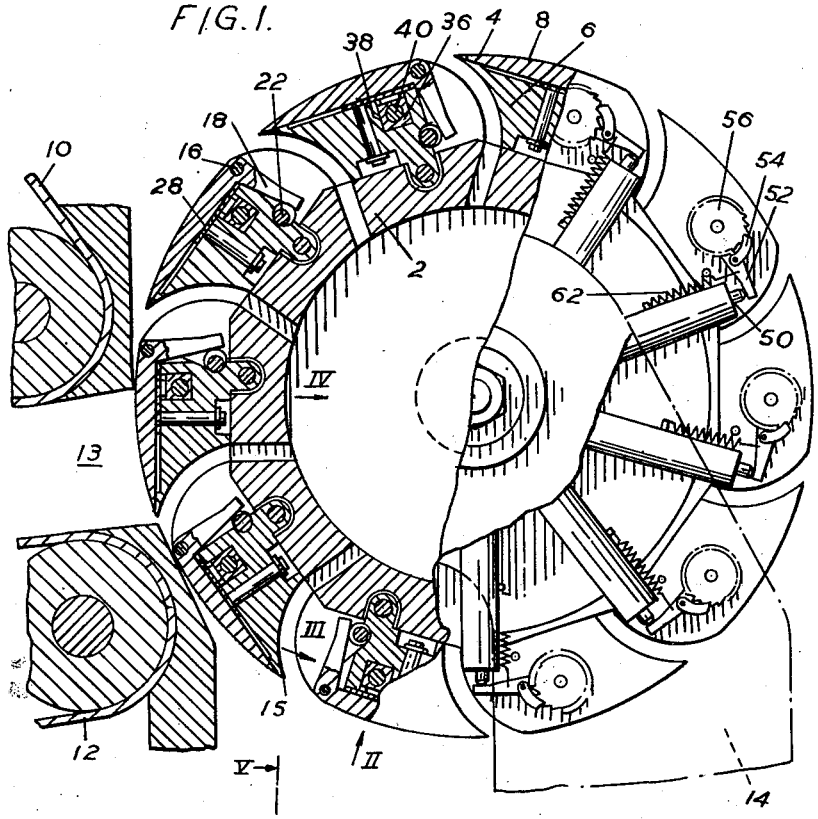
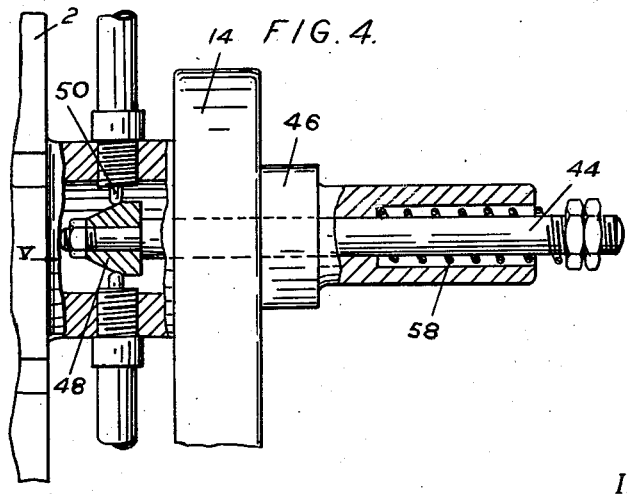
Inventor
PATRICK QUINTIN ROBERT SCHREIBER,
By Robert B Larson
Attorney Oct. 21, 1952 P. Q. R. SCHREIBER 2,614,596
MACHINE FOR CUTTING TOBACCO AND THE LIKE
Filed March 29, 1950 2 SHEETS—SHEET 2
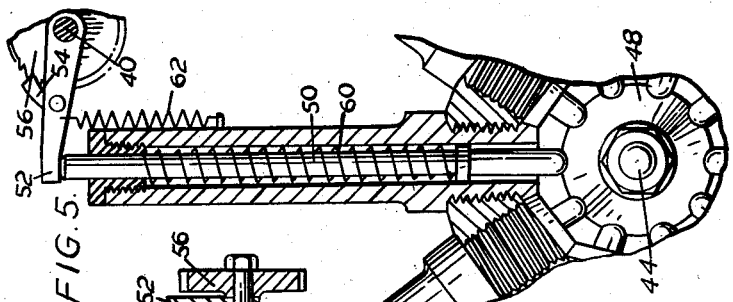
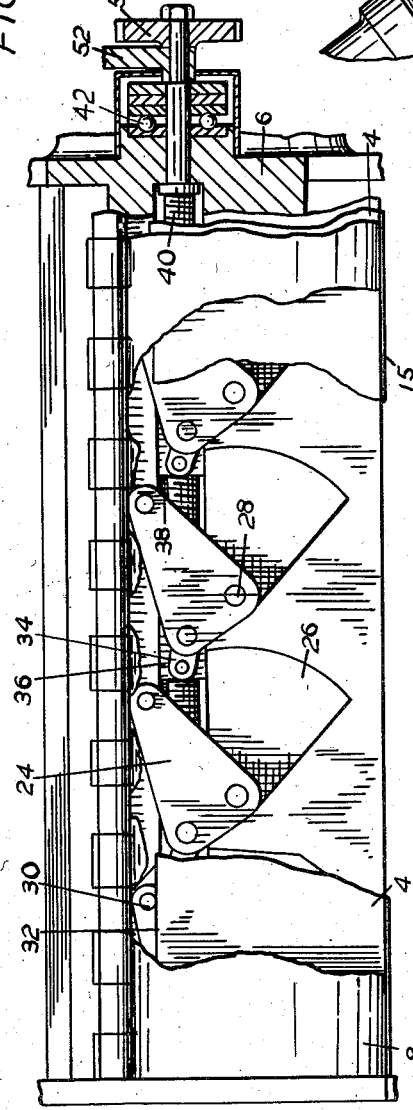
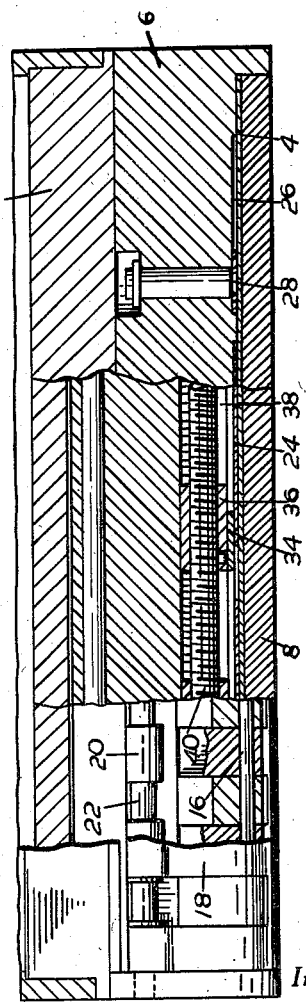
Inventor
PATRICK QUINTIN ROBERT SCHREIBER,
By Robert B. Larson
Attorney Patented Oct. 21, 1952

2,614,596

UNITED STATES PATENT OFFICE 2,614,596

MACHINE FOR CUTTING TOBACCO AND THE LIKE

Patrick Quintin Robert Schreiber, London, England, assignor to Robert Legg Limited, London, England, a British company Application March 29, 1950, Serial No. 152,698
In Great Britain April 5, 1949

3 Claims. (Cl. 146—117)

The present invention relates to rotary cutters used in apparatus for cutting leaf tobacco and the like. These cutters comprise a drum which carries a plurality of knives having cutting edges extending substantially parallel to the axis of the drum. In order to obtain a rapid rate of cutting, the knives are commonly arranged as close together as is practicable around the circumference of the drum. There is accordingly little space available for mechanism by which the knives may be moved outwards as their cutting edges are worn away.

It is an object of the invention to provide more compact mechanism for moving the knives of a rotary cutter.

It is a further object of the invention to provide mechanism whereby all the knives of a rotary cutter may be moved outwards in unison under precise control.

It is a further object of the invention to provide mechanism whereby all the knives of a rotary cutter may be moved outwards upon the reciprocation of a single member.

Further objects and advantages of the invention will appear from the following description of an embodiment of the invention in which reference is made to the accompanying drawings in which:

Figure 1 is an end elevation of the cutter, partly in section;

Figures 2 and 3 are views on a larger scale of one knife and associated mechanism, considerably broken away and viewed in the directions of the arrows II and III in Figure 1;

Figure 4 is a side elevation of one end of the cutter, seen in the direction of the arrow IV in Figure 1; and Figure 5 is a section on the line V—V in Figure 4.

The cutter consists of a drum-like body 2 carrying a number of knives 4 which are each clamped between a lower plate 6 and an upper plate 8. Tobacco is fed by two conveyors 10 and 12 to a mouthpiece 13 and is shredded by the rotating cutter which is supported in bearings 14. The cutting edges 15 of the knives 4 are gradually worn away both by the action of cutting and by a grinding device by which they are kept sharp. In order to maintain the effective diameter of the cutter constant, the knives are progressively fed outwards from between the lower and upper plates 6 and 8.

Each upper plate 8 is pivoted on a shaft 16 and has a number of projecting arms 18. These rest against eccentric cams 20 on a shaft 22, and when the latter is turned the upper plate 8 is pressed towards the lower plate 6 and so clamps the knife 4.

A number of bell-crank levers 24 are housed in recesses 26 in the lower plate 6 and are pivoted at 28. Each lever carries a pin 30 which bears against the rear edge 32 of the knife 4, and each lever is connected by a pivoted link 34 to a nut 36 which can slide in a slot 38. A threaded shaft 40 passes through all the nuts 36 lying beneath one knife, and is located axially by a thrust bearing 42. Rotation of the shaft 40 anticlockwise in Figure 1 causes all the nuts 36 to slide along the slot 38 to the right in Figures 2 and 3 and so swing the levers 24 and urge the knife 4 evenly forward against the friction due to the clamping action of the upper plate 8.

A plunger 44 projects from one end of a stub shaft 46 on which the drum 2 is supported. The inner end 48 of this plunger is conical and engages the bases of radially extending push rods 50, one of which corresponds to each knife. At its outer ends each push rod engages an arm 52 turning on the end of the shaft 40 and carrying a pawl 54 which engages a ratchet wheel 56 secured to the shaft. Each time the plunger 44 is depressed, all the shafts 40 are turned by the same amount, and so all the knives 4 are fed outwards to the same extent. The plunger and associated mechanism are returned by springs 58, 60 and 62.

I claim:

1. A rotary cutter for material such as leaf tobacco comprising, a drum, a plurality of knife support sections disposed about the drum, a plurality of knives mounted in a plane parallel to the axis and substantially perpendicular to the radius of said drum, and individual means for moving each knife in its own plane, comprising, a plurality of levers spaced along said drum and pivoted to swing in a plane parallel to and immediately below said knife, elements carried by said levers and in engagement with the part of said knife remote from said cutting edge, a threaded shaft parallel to each said cutting edge, means connecting said shaft to said levers to swing said levers upon rotation of said shaft thus forcing said cutting edge outwardly on said drum.

2. A rotary cutter according to claim 1, in which said support sections together with said means for moving each knife are removable from said drum.

3. A rotary cutter according to claim 1, and means including ratchet and pawl mechanisms connected by a common actuator for rotating said shafts and thus moving said knives outwardly in unison.

PATRICK QUINTIN ROBERT SCHREIBER.

REFERENCES CITED

The following references are of record in the file of this patent:

UNITED STATES PATENTS

| Number | Name | Date |
| --- | --- | --- |
| 2,464,896 | Schreiber | Mar. 22, 1949 |
| 2,484,403 | Dearsley | Oct. 11, 1949 |